US011161681B2

United States Patent
Morrison et al.

(10) Patent No.: US 11,161,681 B2
(45) Date of Patent: Nov. 2, 2021

(54) PROPELLANTLESS AEROSOL SYSTEM

(71) Applicant: Rust-Oleum Corporation, Vernon Hills, IL (US)

(72) Inventors: Adam P. Morrison, Belvedere, IL (US); Kelly A. Markle, Gurnee, IL (US)

(73) Assignee: Rust-Oleum Corporation, Vernon Hills, IL (US)

( * ) Notice: Subject to any disclaimer, the term of this patent is extended or adjusted under 35 U.S.C. 154(b) by 0 days.

(21) Appl. No.: 16/795,530

(22) Filed: Feb. 19, 2020

(65) Prior Publication Data

US 2021/0009339 A1 Jan. 14, 2021

Related U.S. Application Data

(63) Continuation of application No. 14/058,770, filed on Oct. 21, 2013, now abandoned.

(60) Provisional application No. 61/716,063, filed on Oct. 19, 2012.

(51) Int. Cl.
| | |
|---|---|
| *B65D 83/62* | (2006.01) |
| *B05B 9/08* | (2006.01) |
| *B05B 11/00* | (2006.01) |
| *B65D 83/38* | (2006.01) |
| *B65D 83/46* | (2006.01) |
| *B65D 83/14* | (2006.01) |

(52) U.S. Cl.
CPC ............ *B65D 83/62* (2013.01); *B05B 9/0811* (2013.01); *B05B 9/0838* (2013.01); *B05B 11/0067* (2013.01); *B05B 11/3016* (2013.01); *B65D 83/38* (2013.01); *B65D 83/46* (2013.01); *B65D 83/7535* (2013.01); *Y02W 30/80* (2015.05)

(58) Field of Classification Search
CPC ....... B65D 83/62; B65D 83/38; B05B 9/0811; Y02W 30/80
See application file for complete search history.

(56) References Cited

U.S. PATENT DOCUMENTS

| | | | | |
|---|---|---|---|---|
| 4,034,916 A | * | 7/1977 | Forsberg | B05B 7/2494 239/373 |
| 4,162,030 A | * | 7/1979 | Capra | B05B 9/0822 222/105 |
| 5,012,951 A | * | 5/1991 | Miczka | B65D 83/38 220/626 |
| 5,060,826 A | * | 10/1991 | Coleman | B67D 1/0462 222/95 |
| 5,179,982 A | * | 1/1993 | Berube | B65D 83/70 141/20 |
| 5,211,316 A | * | 5/1993 | Adalberto | B65D 83/62 222/386.5 |
| 5,405,060 A | * | 4/1995 | von Schuckmann | B05B 7/2427 222/325 |
| 5,865,350 A | * | 2/1999 | Losenno | B65D 83/62 222/402 |
| 6,196,275 B1 | * | 3/2001 | Yazawa | B65B 31/003 141/18 |

(Continued)

*Primary Examiner* — Paul R Durand
*Assistant Examiner* — Randall A Gruby
(74) *Attorney, Agent, or Firm* — McDonnell Boehnen Hulbert & Berghoff LLP

(57) ABSTRACT

A propellantless aerosol fluid dispensing system including a reusable pressurizable canister and a disposable fluid containing pouch, the pouch including a valve assembly for dispensing the fluid.

19 Claims, 12 Drawing Sheets

(56) References Cited

U.S. PATENT DOCUMENTS

| | | | |
|---|---|---|---|
| 8,006,873 B2* | 8/2011 | Vanblaere | B65D 83/64 |
| | | | 222/389 |
| 10,065,204 B2* | 9/2018 | Neal | B05B 11/046 |
| 2013/0284759 A1* | 10/2013 | Teramoto | B65D 83/20 |
| | | | 222/94 |

* cited by examiner

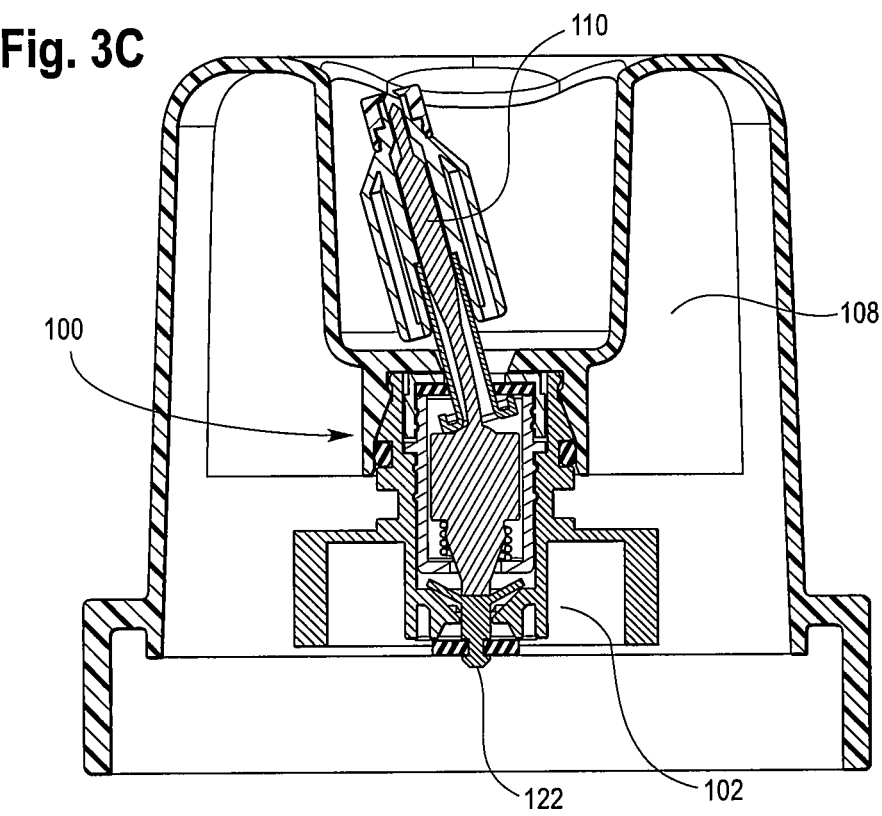
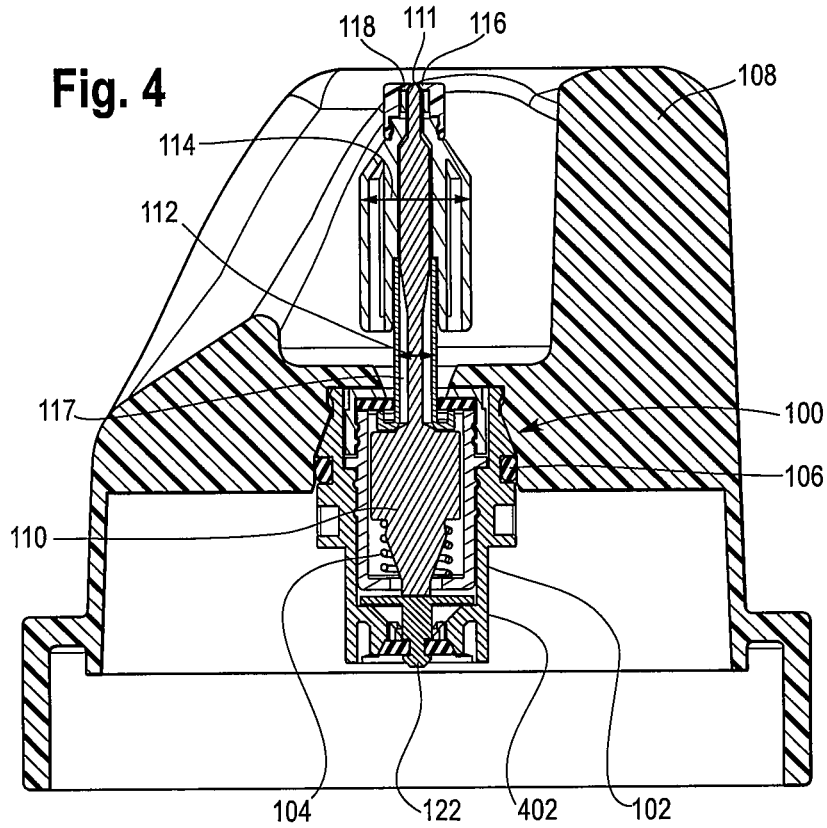

PROPELLANTLESS AEROSOL SYSTEM

CROSS-REFERENCE TO RELATED APPLICATIONS

This application is a continuation of U.S. patent application Ser. No. 14/058,770 filed on Oct. 21, 2013, which claims priority to Provisional Patent Application No. 61/716,063 filed on Oct. 19, 2012, the specifications of which are incorporated herein in their entirety by reference.

BACKGROUND OF THE INVENTION

(1) Field of the Invention

This invention concerns propellantless aerosol fluid dispensing systems including a reusable pressurizable canister and one or more disposable liquid-containing pouches.

(2) Description of the Art

Current aerosol paint canisters—also known as "spray paint"—are popular because of their ease of use. Conventional aerosol paint canisters are sold in single use pressurized canisters. Single use spray paint cans create waste disposal problems. Because the cans are single use cans, they create a large volume of waste that must be disposed of. In some cases, disposal regulations require that the cans be depressurized prior to disposal and/or because of their contents, the cans must be treated as hazardous waste each of which increases disposal costs. Therefore, there is a need to develop more ecologically-friendly aerosol-based liquid dispensing systems that are reusable and/or that produce smaller volumes of waste materials without compromising the primary benefits of aerosol systems which is their ease-of-use.

SUMMARY OF THE INVENTION

One aspect of this invention is a propellantless fluid dispensing system comprising: a container having a pressurizable chamber, the pressurizable chamber including a sealable opening and at least one aperture; a pressurizing means for intermittently or continuously pressurizing the pressurizable chamber; one or more pressure-collapsible pouches each containing a dispensable fluid material, the one or more pressure-collapsible pouches each having at least one opening; a valve assembly associated with each of the one or more pressure-collapsible pouches, the valve assembly comprising the combination of a fitment, a valve and a nozzle wherein the fitment is located in each pressure-collapsible pouch opening such that the pressure-collapsible pouch opening is sealed to the fitment such that the valve assembly valve and nozzle extend at least partially beyond the pressure-collapsible pouch; and a pressure resistant pouch seal.

Another aspect of this invention is a propellantless aerosol fluid dispensing system comprising: a container having a pressurizable chamber and a second chamber, the pressurizable chamber and the second chamber separated by a wall, the pressurizable chamber including a sealable opening at one end of the pressurizable chamber; a cap associated with the pressurizable chamber open end, wherein the union of the cap with the pressurizable chamber open ends forms a pressure resistant cap seal and wherein the cap includes an aperture; a pressurizing means located in the second chamber for intermittently or continuously pressurizing the pressurizable chamber; a pressure-collapsible pouch located in the pressurizable chamber, the pouch containing a dispensable fluid material and an opening; a valve assembly including the combination of a fitment, a valve and a nozzle wherein the fitment is located in the pressure-collapsible pouch opening such that the pressure-collapsible pouch opening is sealed to the fitment, the pouch being oriented in the pressurizable chamber such that one or more of the valve and nozzle extends beyond the pressure-collapsible pouch; and a pressure resistant pouch seal formed by the combination of the fitment and cap aperture.

Still another aspect of this invention is a propellantless aerosol fluid dispensing system comprising: a container having a pressurizable chamber, the pressurizable chamber including a first sealable opening at one end, the pressurizable chamber further including at least one aperture having a second sealable opening; and a pressurizing means for intermittently or continuously pressurizing the pressurizable chamber.

Yet another aspect of this invention is a disposable pouch comprising a bottom; side walls; and a top seam, the combination of the bottom, side walls and top seam forming a sealed pouch capable of retaining a fluid wherein the pouch has a single top opening and wherein the top opening includes a valve assembly.

In still another aspect, this invention is disposable pouch comprising: a substantially flat bottom; side walls; and a top seam having one or more tapered seam portions, the combination of the bottom, side walls and top seam forming a sealed pouch having a single top opening; and a valve assembly including a fitment, a valve and a nozzle wherein the fitment is located in the pressure-collapsible pouch opening such that the pressure-collapsible pouch opening is sealed to the fitment so that one or more of the valve and nozzle extends beyond the pressure-collapsible pouch and wherein the fitment includes an extended diameter portion that is located inside the pouch.

DESCRIPTION OF THE FIGURES

FIG. 3C is a side cut-away view of a valve assembly embodiment where the valve has been opened by pivoting the valve stem to permit fluid flow;

FIG. 4 is a view of components of the valve embodiment shown in FIGS. 3A-3C;

DESCRIPTION OF THE INVENTION

The present invention relates to propellantless aerosol fluid dispensing systems that dispense a fluid without the use of a propellant incorporated into the dispensable fluid. Instead, the systems of the present invention dispense fluid by applying pressure to the surface of a pressure collapsible pouch containing a dispensable fluid where the pressure on the pouch urges fluid in the pouch to exit the pouch through a valve assembly that can be opened and closed. The fluid dispensing systems of this invention are useful for dispensing a variety of fluids, such as paints, with a reduced environmental impact in comparison to propellant-based aerosol fluid dispensing systems while retaining the same ease of use as propellant-based aerosol dispensing systems. While the present invention will be discussed in the context of its use in conjunction with paints, the invention is equally suitable for use dispensing fluids that are currently dispensed in aerosol systems that employ mixtures of an aerosol driven fluid plus propellant. Non-limiting examples of such fluids include hair spray, aerosol cleaning and polishing compounds such as furniture wax, silicon and oil spray lubricants, shaving cream, air fresher, deodorants and the like fluids.

Figure 1:
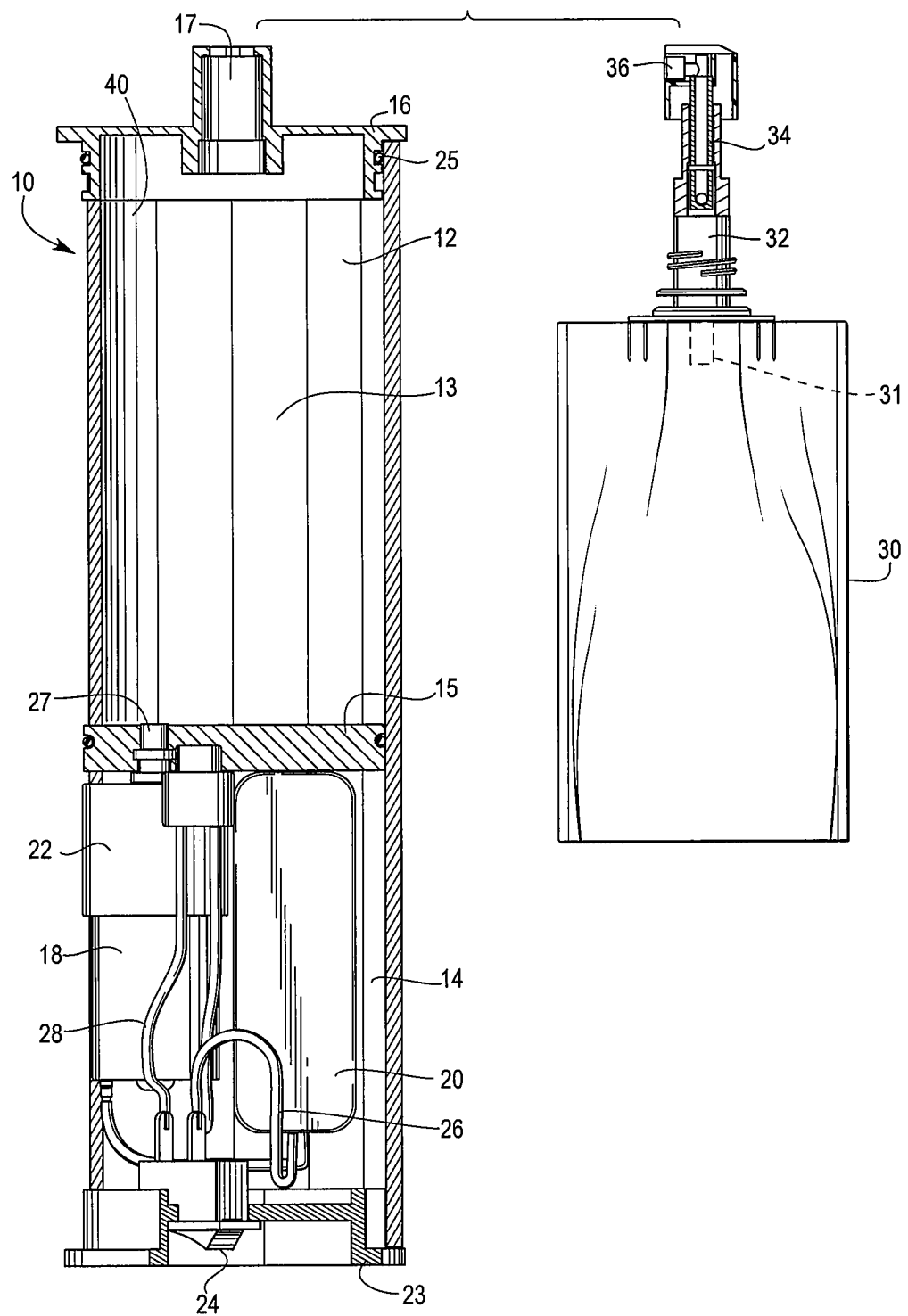
FIG. 1 is a side cutaway view of an aerosol system of this invention including a reusable container 10 and a disposable pouch 30.
Figure 2:
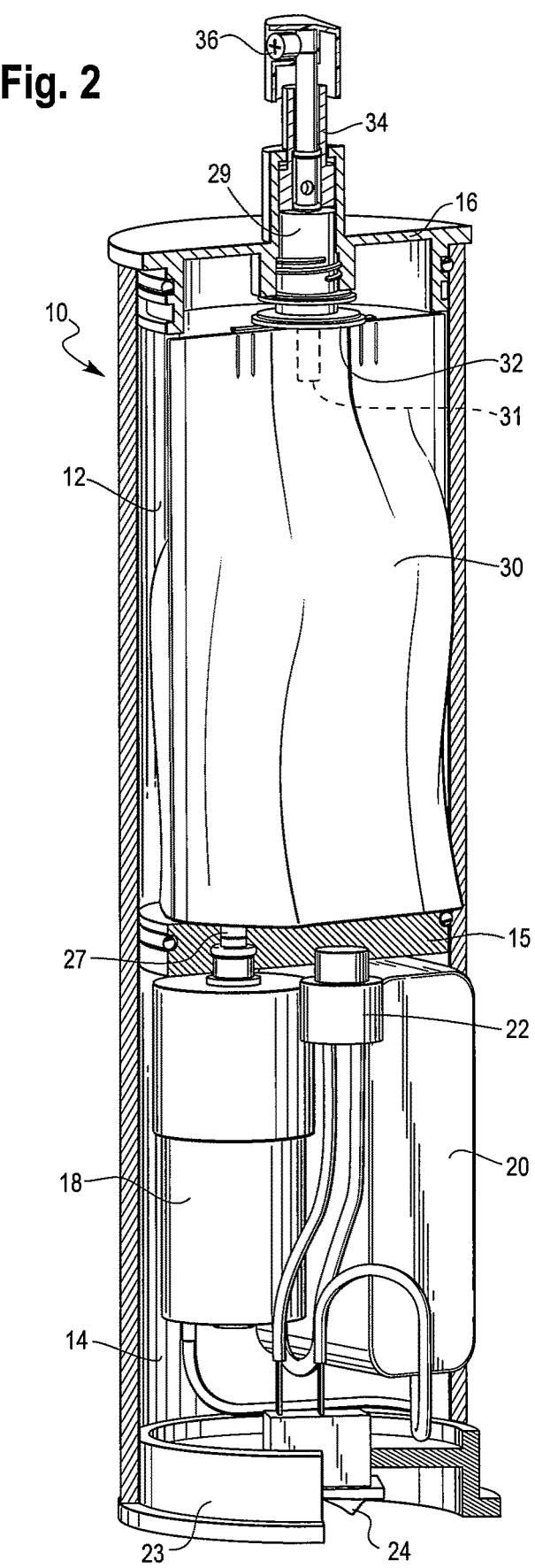
FIG. 2 is a perspective view of the cut-away aerosol system in which a pouch 30 is installed in the pressurizable chamber 12 of reusable container 10.

Referring now to FIGS. 1-2 there are shown views of an embodiment of a propellantless aerosol system of this invention. The system generally includes a reusable container 10 and a pouch 30. Container 10 includes a pressurizable chamber 12 having a cap 16 including and an aperture 17. Container 10 may include an optional second chamber 14 which may be pressurizable or non-pressurizable. One possible purpose of second chamber 14 is to provide a site in which to locate components of or an entire pressurization apparatus that is used to pressurize pressurizable chamber 12. However the pressurization apparatus does not need to be entirely or even partially located in an optional second chamber 14 that directly abuts pressurizable chamber 12. Instead, a second optional chamber—if one is used—may be located remotely from container 10 where it can be associated continuously or intermittently with first pressurizable chamber 14, via a conduit or by directly associating a pressurization apparatus such as a cylinder of pressurized gas with pressurizable chamber 12 via one-way valve.

First pressurizable chamber 12 includes a cavity 13 that is sized to hold one or more pouches 30. Another alternative purpose of first pressurizable chamber 12 is to provide a cavity 13 that is capable of being pressurized and/or that is capable of holding pressure when one or more pouches 30 are located in first pressurizable chamber 12.

In order to accept pouch 30, pressurizable chamber 12 will include an opening 40 having a size sufficient to accept one or more pouches 30. In FIGS. 1-2, pressurizable chamber 12 has a top opening 40 and includes a cap 16 that is associated with and removable from the top opening 40. Cap 16 includes an inside perimeter that includes an O-ring 25 that allows cap 16 to be press fit into or over opening 40 such that a pressure resistant cap seal is created between cap 16 and opening 40.

Cap 16 may be associated with first pressurizable chamber 12 in any manner known in the art that forms a pressure resistant or pressure tight cap seal. For example, cap 16 can be press fit into the open end of first pressurizable chamber 12 as shown in FIGS. 1-2, it can be threaded into the open end of first pressurizable chamber 12, it can be welded to first pressurizable chamber 12 and so forth. What is important is that when cap 16 is engaged with pressurizable chamber 12, no or very little pressurizable fluid in the pressurizable chamber leaks from the seal formed by the union of cap 16 and opening 40 at normal operating pressures.

In other embodiments, container 10 will not have a removable cap 16. Instead, the cap 16 will be permanently attached to pressurizable chamber 12 in which embodiment pressurizable chamber will instead have a removable bottom, a removable side door or some other removable structure(s) that allows the user to place one or more pouches 30 inside first pressurizable chamber 12 and to remove and replace the one or more pouches 30 in pressurizable chamber 12 when the one or more pouches are empty. In addition, the structure—removable cap, door etc . . . —used to provide access to the inside of pressurizable chamber 12 in order to place one or more pouches 30 in or to remove one or more pouches 30 from pressurizable chamber 12 should have a pressure resistant seal that, when engaged with pressurizable chamber 12, forms a seal that allows pressurizable chamber 12 to be pressurized with a pressurizable fluid when one or more pouches 30 are located within the pressurizable chamber 12. Also in this embodiment, the user will still need to be able to form a second seal where valve 34 of pouch 30 protrudes through an aperture 17 in container 10.

Figure 10:
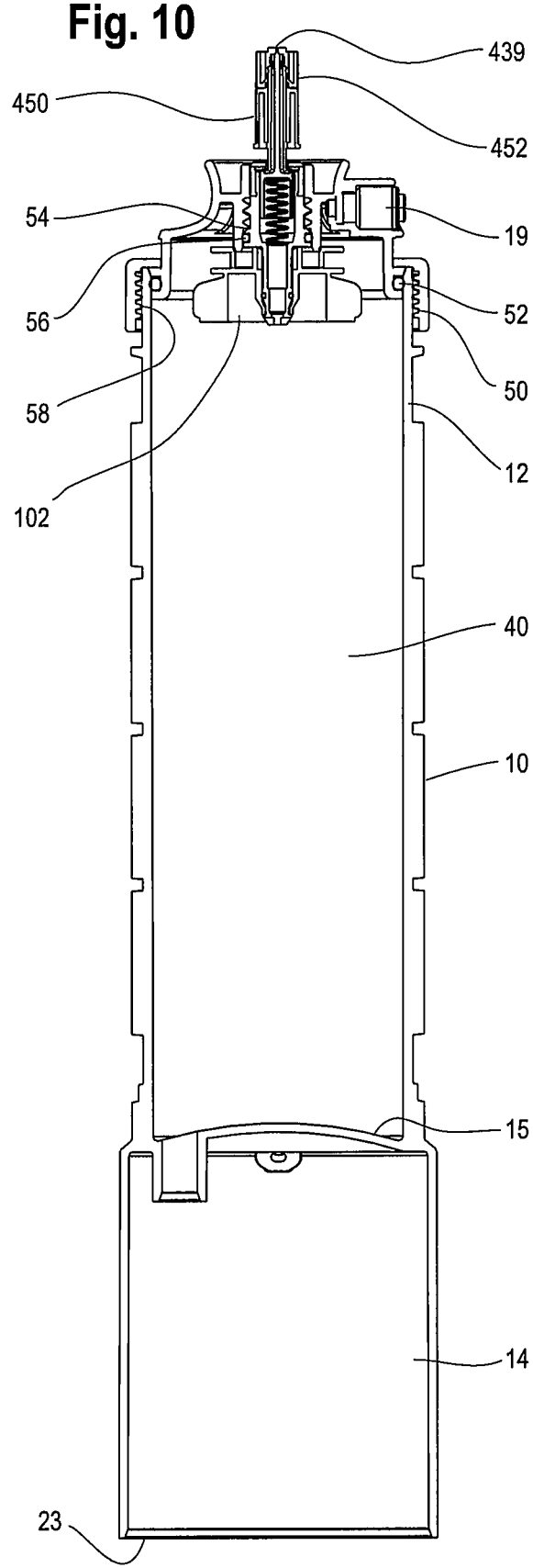
FIG. 10 is a front cut-away view of an embodiment of a propellantless aerosol fluid dispensing systems of this invention without a pouch but including a valve assembly.

Pressurizable chamber 12 will include an aperture 17 through which valve 34 of pouch 30 is directed. In FIGS. 1-2 and 10, aperture 17 is part of cap 16 which is engaged to opening 40 of container 10. However, the location of aperture 17 is not critical and aperture 17 may be located on any of dimension of container 10 that places nozzle 36 of valve 34 in an optimal user position. For example, aperture 17 can be associated with a wall of pressurizable chamber 12 or with a portion of or an end of container 10 that does not contain pressurizable chamber 12. Container 10 may include a single aperture 17 or multiple apertures 17 to allow for multiple pouches 30 to be located in pressurizable chamber 12 such that at least a portion of valve assembly 100 that includes nozzle 36 of each pouch protrudes from container 10 in a useful orientation. If multiple pouches are simultaneously placed in pressurizable chamber 12, then the apertures can be located in any configuration that allows the nozzle 36 associated with each pouch to be accessible to the user. For example, cap 16 can include three spaced apart apertures 17 through which nozzles 36 of each of three different pouches 30 protrude.

Container 10 may take on any useful shape. For example, container 10 shown in FIGS. 1-2 and 10 is cylindrical in shape. The cylindrical shape is chosen primarily to ensure that the pressure applied to the walls of pressurizable chamber 12 when the chamber is pressurized is evenly distributed around pouch 30 and across the pouch's surface area. The cross-sectional shape of container 10 is not critical and can be any useful shape such as triangular, square, pentagonal and so forth that makes it useful. In addition, container 10 does not need to have a constant cross-section over its length and can, instead be, for example, spherical, oval, conical or any useful three dimensional shape.

As noted above, pressurizable chamber 12 is intended to be pressurized and it should remain pressurized while in use. Any pressurizing means known in the art to intermittently or continuously pressurize a small container may be used. For example, pressurizable chamber 12 may be pressurized with an external pressurized fluid source such as a pressurized gas from a gas cylinder or compressor or hydraulic fluid from an external hydraulic fluid source. In one embodiment, a mechanical pressurization source may be used. Examples of mechanical pressurization sources include, but are not limited to air pumps, spring loaded pistons, and the like. A mechanical pressurization source, such as hand activated air pump, may be separate from container 10 in which case it would be intermittently or continuously attached to container 10 by a conduit or it may be built into container 10.

Container 10 may optionally include a relief valve. The relief valve may be located anywhere on container 10 that allows it to be easily accessible by the user, and that allows for the easy release of pressure from pressurized ball chamber 12. In FIG. 10, a relief valve 19 is located on container cap 16. Depressurizing pressurizable chamber 12 allows cap 16 to be easily removed and facilitates the swift exchange of pouches in pressurizable chamber 12.

Container 10 in FIGS. 1-2 also includes a wall 15 separating pressurizable chamber 12 from second chamber 14. In one embodiment, wall 15 can be a movable wall such as a piston having a one way valve that allows the user to pressurize first pressurizable chamber 12 by moving wall 15 towards first pressurizable chamber 12 like an air pump. In another embodiment, wall 15 is fixed, and it separates pressurizable chamber 12 from second chamber 14.

Second chamber 14 of the device shown in FIGS. 1-2 may but need not be pressurized and includes a compressor 18, a power source 20, a load cell or transducer 22, a switch 24, wires 26 associating the power source 20 with the compressor 18, and wires 28 from load cell 22 to switch 24 which is located on the bottom 23 of container 10. In one embodiment a circuit board including one or more of the wiring, switches, load cell, processor, and other device components may be located in second chamber 14. The combination of these elements forms an embodiment of a pressurization means that is useful to pressurize and maintain the pressure in first pressurizable chamber 12 when the propellantless aerosol system is in use.

In order to pressurize first pressurizable chamber 12 in the embodiment shown in FIGS. 1-2, switch 24 is flipped to the on position thereby activating compressor 18 which is powered by power source 20. Power source 20 may be any power source that is useful for powering the selected pressurizing mechanism. Examples of useful power sources include, but are not limited to, direct electrical connections, batteries, solar cells and so forth. In one embodiment, power source 20 is a replaceable or rechargeable battery.

In the embodiment shown in FIGS. 1-2, compressor 18 operates to direct compressed air through aperture 27 into first pressurizable chamber 12. A transducer 22 monitors the pressure in pressurizable chamber 12 and, when a set pressure is reached, the transducer 22 causes compressor 18 to shut off. If the pressure in first pressurizable chamber 12 drops below the transducer set point, then transducer 22 will activate compressor 18 to increase the pressure in first pressurizable chamber 12 until the pressure set point is reached.

The pressurization equipment described immediately above allows for the automated pressurization of first pressurizable chamber 12. However, the invention is not limited to automated pressurization equipment or techniques. In other embodiments, first pressurization chamber can be mechanically pressurized by, for example, using an integral pump as described above. In another embodiment, an external pump such as a bicycle pump or an external compressor hose can be used by associating the pump or external compressor with a one way valve—such as a tire pressure valve—that is integral to first pressurizable chamber 12. In yet another embodiment, first pressurizable chamber 12 can be pressurized using a hose associated with a pressurized gas canister or by using hydraulic fluid pressurization techniques. In another embodiment, a small replaceable gas canister can be located in second chamber 14 and directly associated with first pressurizable chamber via a pressure control valve. In still another embodiment, a pressurization apparatus may be intermittently associated with first pressurizable chamber 12 to pressurize the chamber. Indeed, the pressure control of first pressurizable chamber 12 can be continuous or intermittent meaning that the pressure can be continuously controlled or alternatively, that the pressure of first pressurizable chamber 12 can be increased on an ad hoc basis when the user notes that the stream of fluid from nozzle 36 is reduced in velocity or intensity.

A pouch 30 is located in first pressurizable chamber 12 when the system is in use. Pouch 30 is a sealed pouch that has a valve assembly including a fitment 32, a valve 34 and a nozzle 36. In the embodiment shown in FIGS. 1-2, a single pouch 30 is located inside pressurizable chamber 12 with its valve 34 passing through aperture 17 such that nozzle 36 is located outside of container 10. Fitment 32 includes and/or will, in conjunction with cap 16 and/or aperture 17 create a pressure resistant pouch seal 29 that prevents pressurized fluid from escaping first pressurizable chamber 12 through aperture 17. Fitment 32, valve 34 and nozzle 36 are generally selected from nozzles and valves used in current propellant driven aerosol cans. However, in the present invention, pressure acting on the surface of pouch 30—and not a propellant—drives the fluid contained in pouch 30 through fitment 32, valve 34 and nozzle 36 when nozzle 36 is manipulated in a manner that opens valve 34.

Figure 3A:
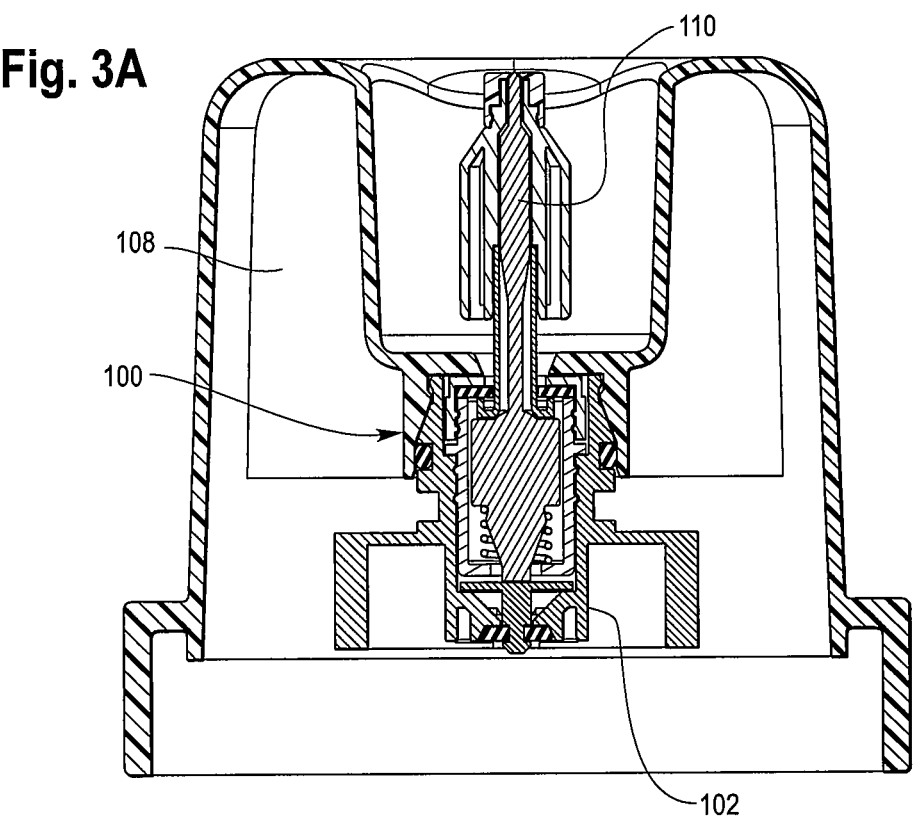
FIGS. 3A and 3B are side cut-away and side perspective views of a valve assembly embodiment useful in conjunction with the paint systems of this invention.
Figure 3B:
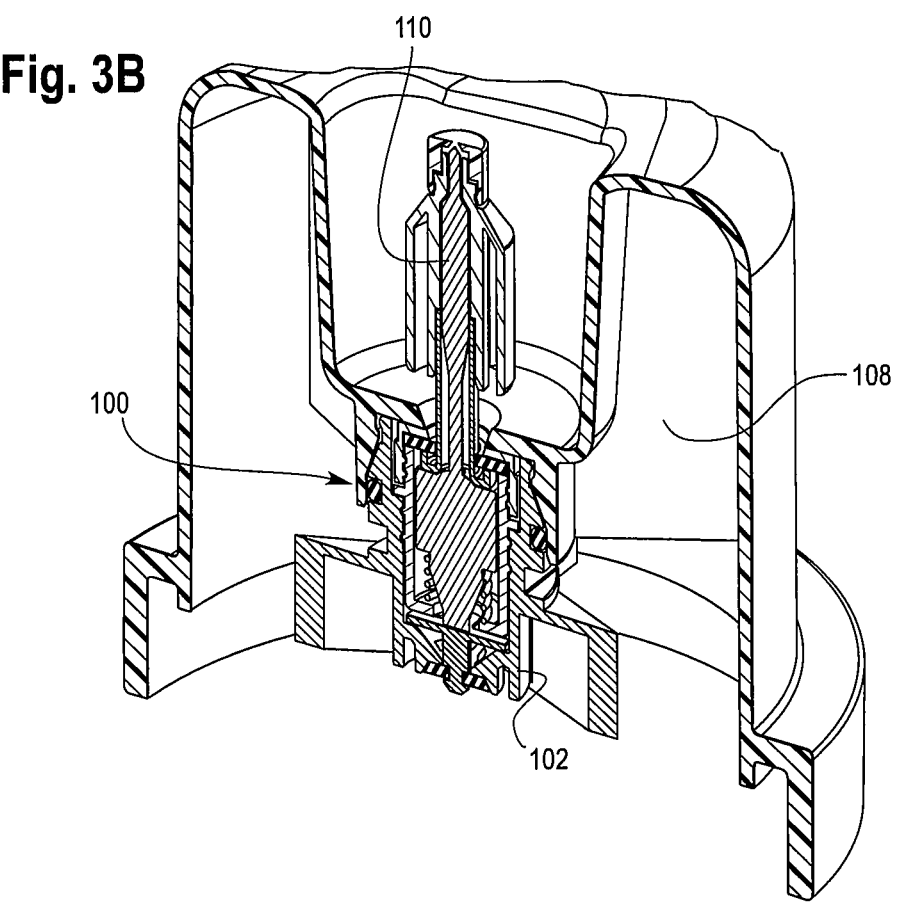

One valve that useful in the propellantless aerosol systems of this invention is shown in FIGS. 3A-3C and 4. FIGS. 3A and 3B are front and perspective cut away views of the valves when it is sealed. FIG. 3C shows the valve when the valve has been opened by tilting the valve assembly. FIG. 4 is a side cutaway view of the valve including the valve components. The valve shown operates like most aerosol valves that actuate by bending the valve stem. The valve assembly 100 is associated with pouch 30 and passes through and is secured within an aperture in cap 108. The valve includes, among other elements a fitment 102, a biasing spring 104, and an O-ring 106 is located where the valve is associated with pouch 30. An elongated valve stem 110 emerges from fitment 102. Valve stem 110 is surrounded by a valve housing 112. At the topmost part of housing 112 is an actuator 114 that is enlarged in size to allow the housing to be manipulated by the user. Fluid passages 117 are located within valve housing 112 in space not occupied by actuator 114. An aperture 116 lies at the topmost portion of valve housing 112 and a needle 118 at the topmost portion of valve stem 110 occupies the aperture 116 and forms a valve top seal 111. A valve bottom seal 122 is located at the bottom portion of stem 110 adjacent to fitment 102.

In operation, as shown in FIG. 3C, a user moves valve housing 112 away from vertical thereby causing valve stem 110 to move from a vertical position. The movement of valve stem 110 from a vertical position to a non-vertical position causes needle 118 to move out of aperture 116 which breaks valve top seal 111. The pivoting of stem 110 away from vertical also causes the valve bottom seal 122 to unseat thereby allowing fluid from pouch 30 to enter fitment 102, pass through fluid passages 117 and out aperture 116. The further that stem 110 is moved from vertical, the greater the opening and the greater the volume of fluid that can pass from pouch 30 through aperture 116.

Figure 5:
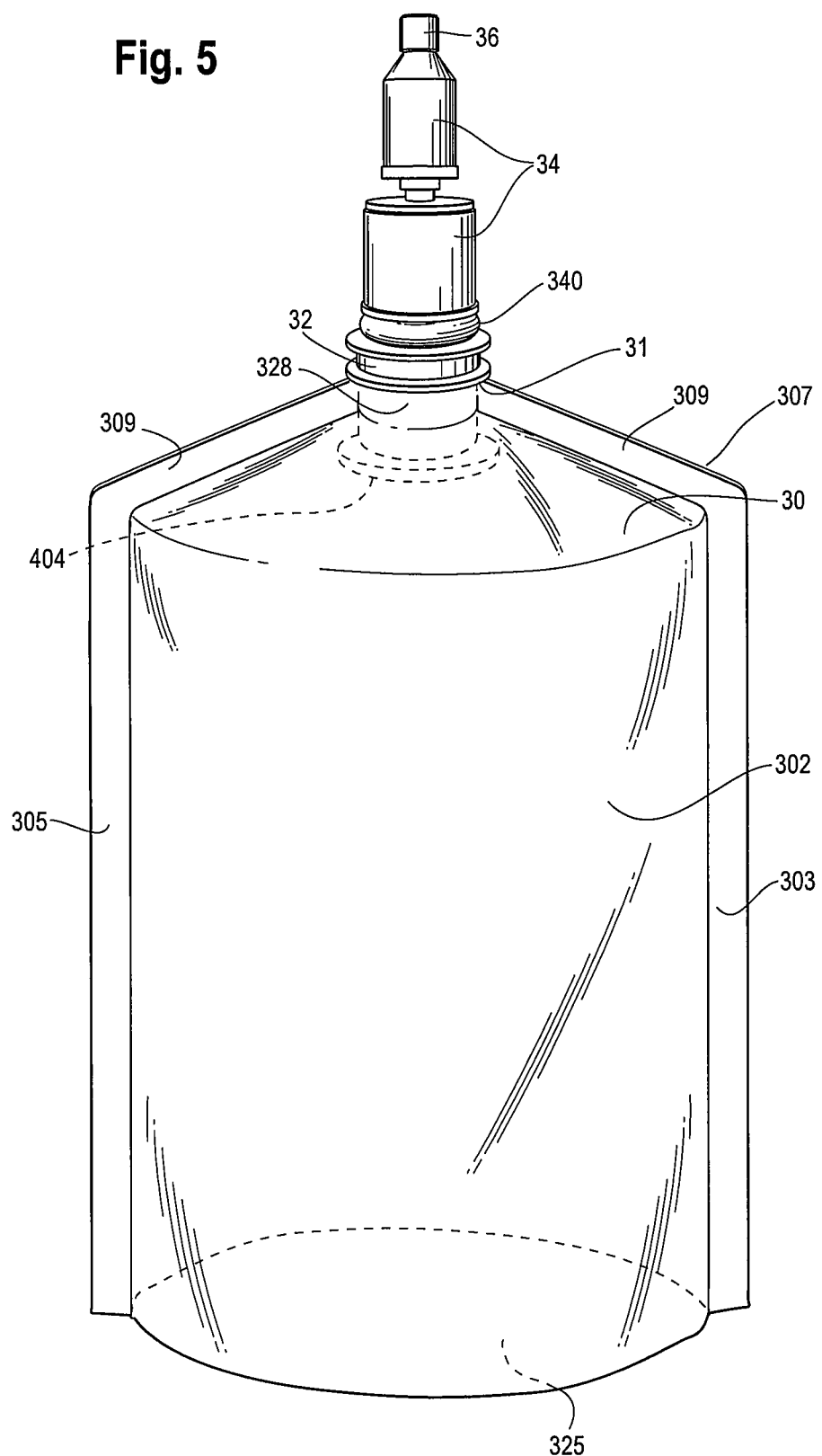
FIG. 5 is a side view of an embodiment of a pouch of this invention.
Figure 6:
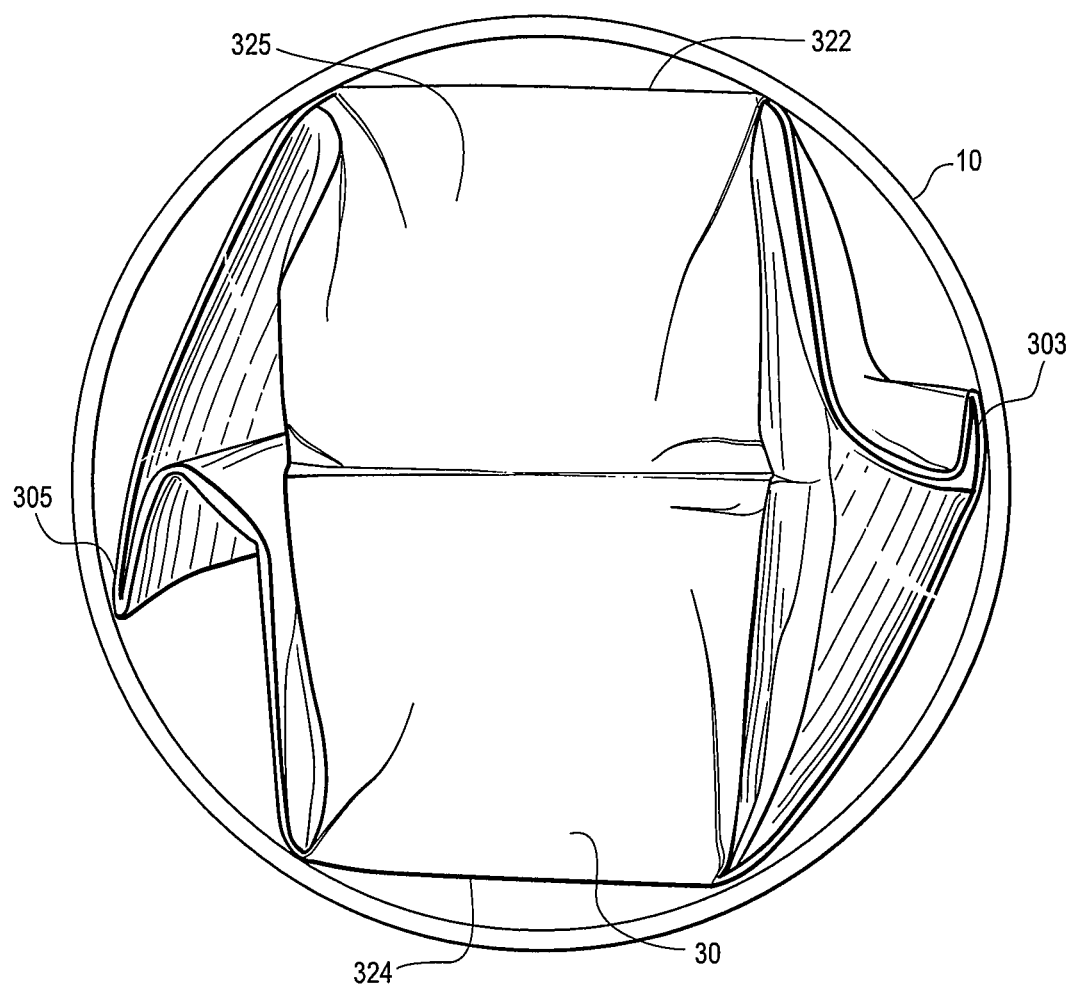
FIG. 6 is a view of the bottom of the FIG. 5 pouch embodiment after it has been loaded into a reusable container of this invention.
Figure 7:
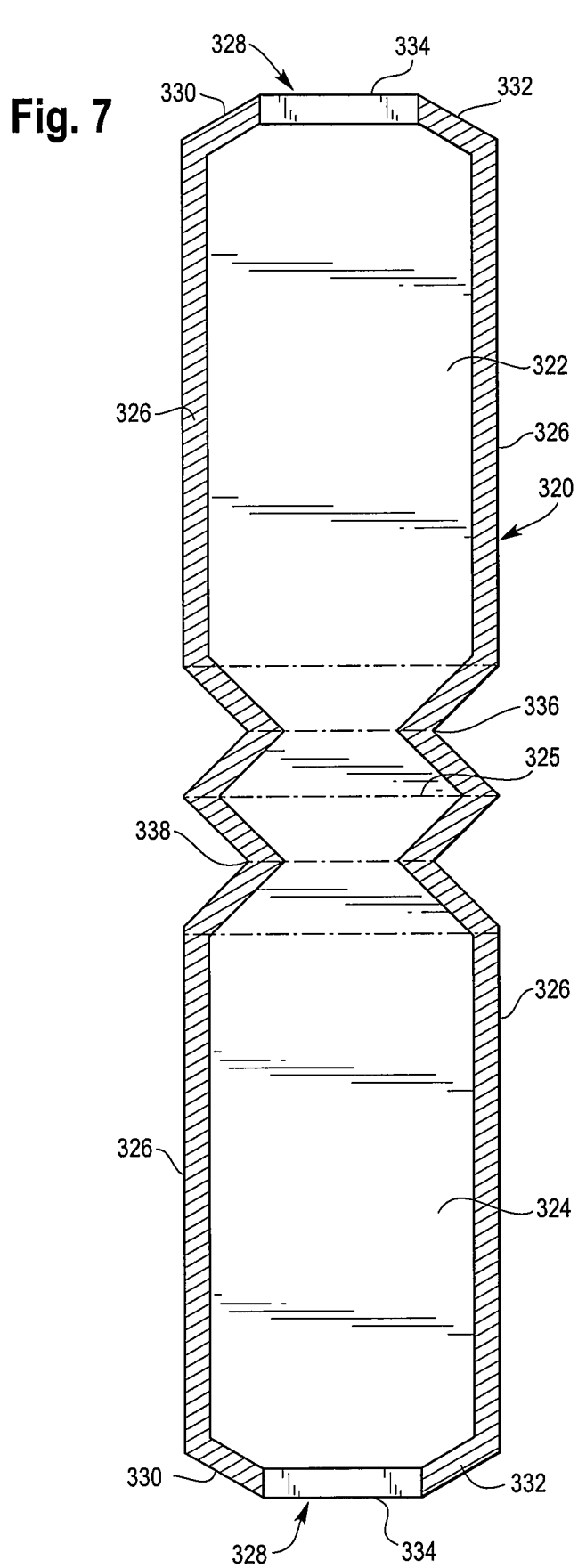
FIG. 7 is an unassembled view of a pouch embodiment of this invention.

An alternative embodiment of a pouch useful in the propellantless aerosol systems of this invention is shown in FIGS. 5-7. Pouch 30 is made of a pressure malleable material that forms a closed container holding fluid 302 and including opposing walls 322, 324, an opening 31 and a bottom 325. Pouch 30 is preferably made of a material that can collapse under pressures of from about 10 to about 50 psi. Such materials include, but are not limited to polymer films, metal foils and metal foil polymer film combinations.

Bottom 325 of pouch 30 may take on any shape. It may be convex, concave, flat and so forth. When pouch 30 contains fluid containing particulates, then a bottom 325 that is substantially flat is useful to allow for better mixing of the fluid contents and/or to prevent particles in the fluid from agglomerating in wrinkles and folds. The term "substantially flat" refers to a pouch bottom having at least 50%, preferably at least 80% and most preferably at least 90% of the surface area of the bottom of the pouch being coplanar with a planer surface upon which the pouch lies.

The perimeter of the pouch can take on any useful shape. In pouch 30, perimeter includes two parallel vertical seams 303 and 305 and a top seam 307 broken by opening 31 a portion to all of which is perpendicular to vertical seams 303, 305. Bottom 325 of pouch 30 is flat and typically does not include a seam. The intersection of the vertical seams 303, 305 with top seam 307 can form a right angle or it can be angled to form on or more tapered top section s 309 where the seam tapers upwards from the top of one or both of vertical seams 303, 305 upwards towards opening 31. A tapered top section 309 can be formed by creating a seam or it can be formed merely by folding over a top corner of the pouch along a fold line (not shown)

FIG. 7 is an unassembled view of a malleable material sheet 320 that is formed into pouch 30. Sheet 320 includes two opposing walls 322 and 324 and a flat bottom portion 325. Each wall includes opposing vertical seams portions 326. Vertical seam portions 326 run uninterrupted along the edges of walls 322, 324 and bottom 325 of sheet 320. Walls 322 and 324 further include a top edge 328. Top edge 328 includes opposing tapered seam portions 330 and 332 and a central portion 334 that is oriented perpendicular to walls 322, 324. It should be noted that the term "tapered seam portion" includes tapered portions that do not include seams as the term is intended to encompass pouches with one or more tapered top sections—sections where the pouch perimeter tapers at an upward angle from the walls towards the valve assembly.

Pouch 30 is assembled from sheet 320 by folding sheet 320 at folds 336 and 338 to bring opposing walls 322 and 324 together and thereafter sealing the opposing seams to together to form vertical seams 303 and 305. In addition, opposing tapered seam portions 330 and 332 are brought together and sealed. The seams can be sealed by any means know in the art such as by using an adhesive material or by heat welding the seams together. The resulting pouch 30 will include a sealed perimeter and a single opening 31 that includes central portion 334 of opposing walls 322 and 324 which is not sealed.

To complete the pouch a fitment 102—either alone or part of a valve assembly is located in opening 31 and the top edges 328 of the pouch that define central portion 334 are sealed to the fitment sealing surface 402. Again top edges can be sealed to fitment sealing surface 402 using any means known in the art such as by using an adhesive, heat welding or sonic welding.

Fitment sealing surface 402 and/or at least a portion of the fitment 102 that is located within pouch 30 can have an extended diameter or extended diameter portion 404 that has an effective diameter (the largest distance across the fitment if the fitment cross-section is not circular) that is large enough to prevent the inside wall portions of the pouch in the vicinity of fitment 102 from moving towards one another during use to such an extent that the flow of fluid into fitment inlet 408 is reduced or blocked. During use, fluid pressure in pressurizable chamber 12 will, when fluid is flowing out of pouch 30, compress pouch 30. As pouch 30 compresses, opposing walls 322 and 324 move towards each other. The extended diameter portion 404 of fitment 102 prevents walls 322 and 324 from inhibiting flow of fluid into fitment inlet 408. In one embodiment, the fitment seal diameter and/or the fitment extended diameter portion will have a diameter that is from about 1X to about 2X or more greater than diameter of the pouch opening.

Figure 8:
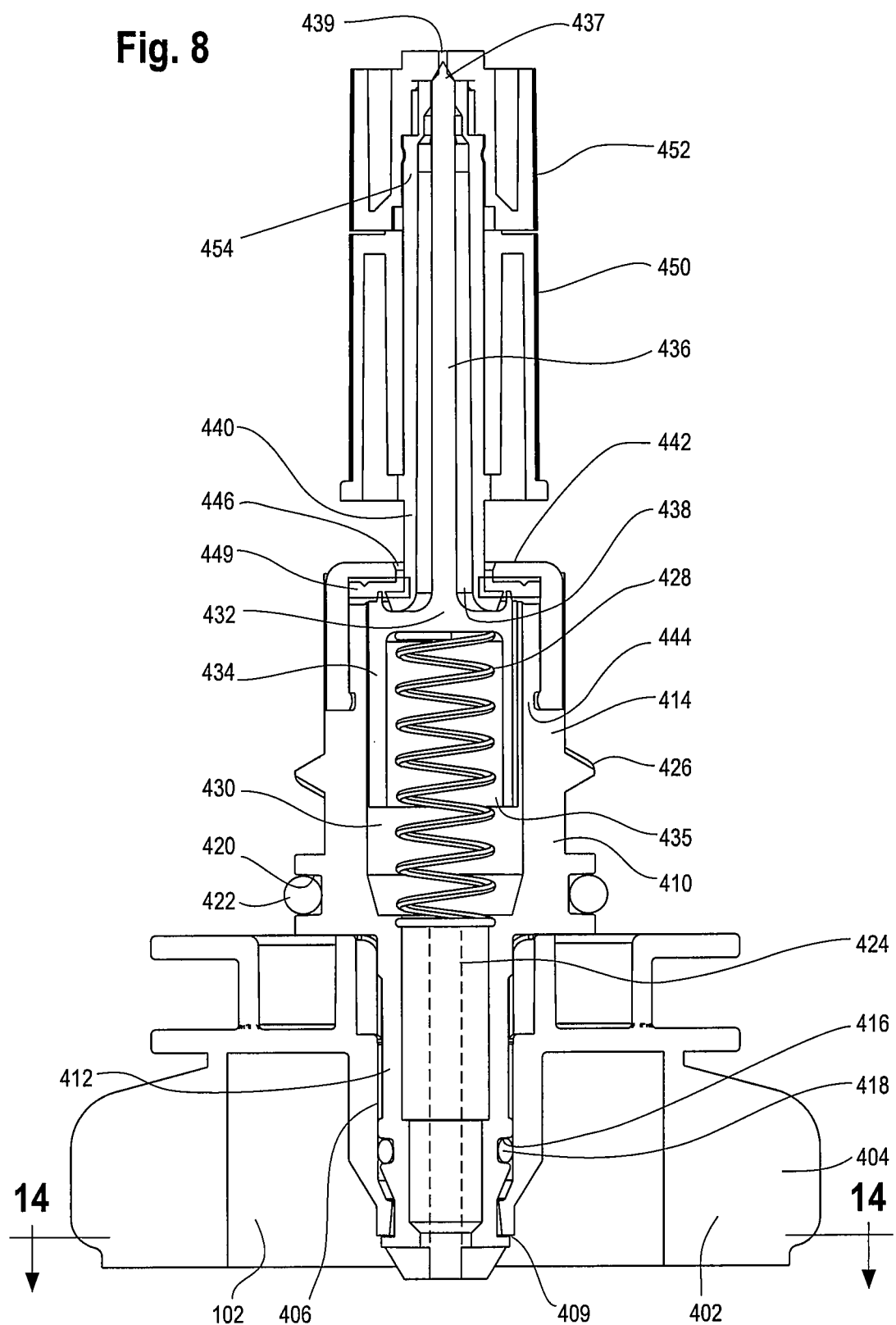
FIG. 8 is a side cutaway view of a valve assembly useful in the disposable pouches of this invention.
Figure 9:
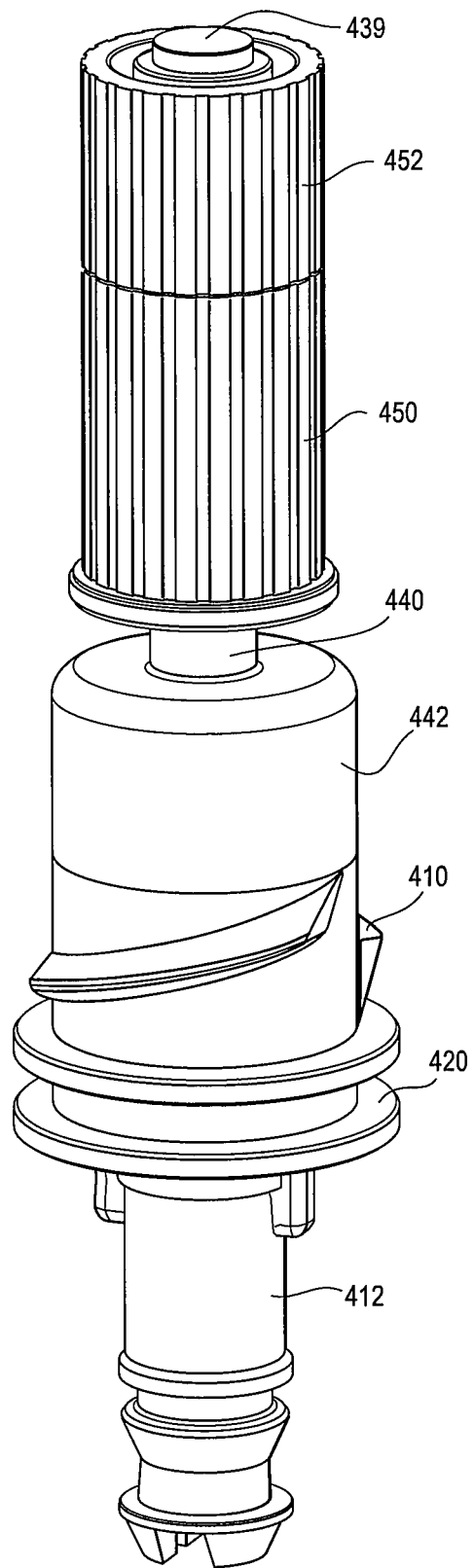
FIG. 9 is a perspective view of the assembled valve assembly of FIG. 8 without the fitment.

A side cutaway view of an embodiment of valve assembly useful in the present invention is shown in FIG. 8 a perspective view of the valve assembly without the fitment is shown in FIG. 9. In FIGS. 8-9, the valve assembly includes a fitment 102 having a sealing surface 402 to which the inside wall of pouch opening 31 is sealed. Sealing surface 402 can have an extended diameter and/or it can further include an extended diameter portion 404. Fitment 102 further includes a conduit 406 including an opening 409 through which fluid can flow when pouch 30 is exposed to an external fluid pressure source. A housing 410 having a first end 412 and a second end 414 is associated with fitment 102 such that housing first end 412 is located in fitment conduit 406. Housing 410 also includes a first O-ring recess 416 for holding O-ring 418 and a second O-ring recess 420 for holding O-ring 422. O-ring 418 seals and retains housing first end 412 in fitment conduit 406.

Housing 410 further includes a central conduit 424 that is complementary to fitment conduit 406 such that fluid passes from the pouch into and through fitment conduit 406 and through housing central conduit 424. Alternatively, fluid can enter laterally from fitment conduit 406 into housing central conduit 424. Housing 410 also includes threads 426 or some other attaching mechanism to allow cap 16 to be reversibly attached with and to form pressure resistant pouch seal between valve 24 and cap 16. Housing 410 includes two opposing quarter turn threads 426 that are associated with complementary threads 510 in cap 16. Threading cap 16 towards housing 410 creates a pressure resistant pouch seal between cap 16 and the pouch valve assembly 34 at O-ring 420. Other sealing mechanisms or means know in the art may be used to sealably unite cap 16 with valve 34. For example, pouch 30 of FIG. 5 includes an O-ring 340 that allows aperture 17 of cap 16 to press-fit onto the valve assembly to form a pressure resistant pouch seal.

A biasing spring 428 is partially or fully located in an aperture 430 in housing second end 414. A needle mechanism 432 having a base 434 including an aperture 435 and a needle 436 is associated with housing second end 414 such that aperture 435 fits over biasing spring 428. Needle 436 passes through an aperture 438 and into stem 440 where the tapered end 437 of needle 436 is urged by biasing spring 428 to block outlet 439 of mechanical break up nozzle (MBU) 452. A cap 442 having a first open end 444 and a second end 446 having an opening that is large enough for a portion of the stem 440 to pass through is sealed to housing second end 414 thereby compressing biasing spring 428 and urging needle 436 into MBU outlet 439. A gasket 449 is located inside cap first open end in order to seal cap 442 against housing second end 414. A stem collar 450 is placed over the portion of stem 440 that extend beyond cap 442 and an MBU 452 having a central aperture 454 through which end 44 of stem 440 passes is associated with the stem 440 and stem collar 450 such that the MBU is at the end of the valve assembly. Finally, an optional shipping cap (not shown) can be placed over the valve.

The valve shown in FIGS. 8-9 operates similarly to the valve show in FIG. 4. The user presses stem collar 450 and/or MBU 452 to pivot the stem away from vertical. As stem 440 moves away from vertical, the liquid seal created by tapered end 437 of needle mechanism 432 being urged into outlet 439 is broken allowing fluid to flow through the valve mechanism exiting the valve assembly at outlet 439.

Figure 14:
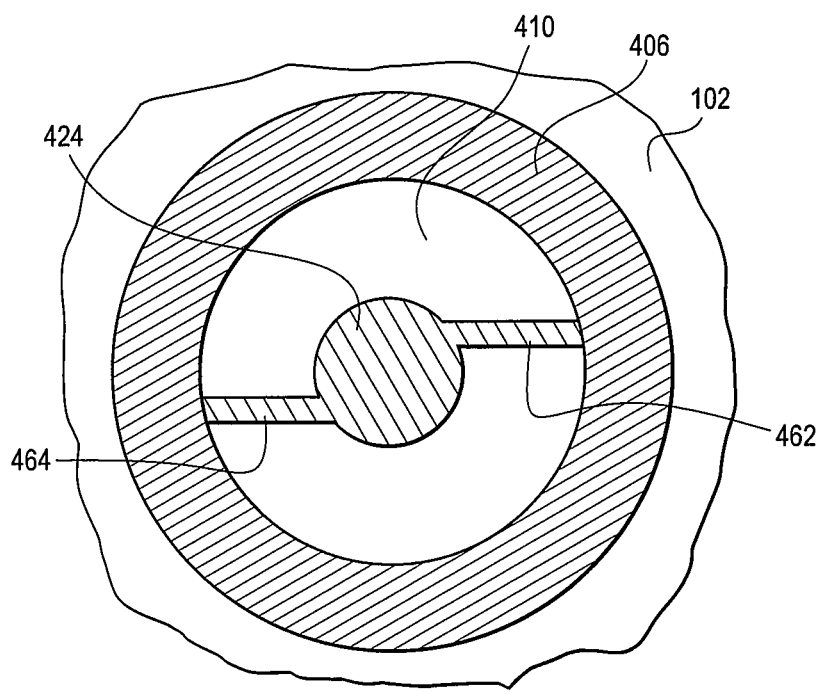
FIG. 14 is a view through section-X—of FIG. 8 of lateral channels in the valve assembly of FIGS. 8-9.

FIG. 14 is a view through section X of a portion of the valve assembly shown in FIGS. 8-9 that includes lateral flow channels. The lateral flow channels function in conjunction with the housing central conduit to change the direction of flow of fluid passing through the valve. In FIG. 14, two lateral channels 462 and 464 direct fluid from fitment conduit 406 into central conduit 424 of housing 410. The valve assembly may include one, two or more than two lateral channels. The lateral channels can be oriented with their outlets directed towards the center of central conduit 424 or the outlet can off center as shown in FIG. 14. The lateral channels aid in causing the fluid traveling up central conduit 424 to swirl as it exist the valve assembly and the device thereby promoting mixing of the fluid mixture and inhibiting fluid dead spots in the valve assembly.

In the valve/fitment embodiment shown in FIGS. 3A-3C the valve assembly includes an optional valve bottom seal 122 at the valve bottom. The valve embodiment shown in FIGS. 8-9 does not include valve bottom seal. Instead, the tapered end 437 of needle 436 provides the only liquid seal by being urged by biasing spring 428 into central aperture 439 of stem 440 to block fluid flow when the valve assembly is in a vertical orientation.

FIG. 10 is a front cut-away view of an embodiment of a propellantless aerosol fluid dispensing systems of this invention without a pouch but including the valve assembly. In FIG. 10, container 10 includes a first pressurizable chamber 12 and a second chamber 14. Cap 16 includes a pressurizable cap seal (a threaded connection 50 and O-ring 52 that seals opening 40 of pressurizable chamber 12. Cap 16 also includes a central aperture 17 through which the valve assembly 100 associated with pouch 30 (not shown) is directed. Cap 16 further includes a pressure resistant pouch seal 29 that includes a threaded connection 54 and O-ring 56 that creates a pressurizable seal around the valve assembly. Cap 16 further includes a relief valve 19.

Figure 13:
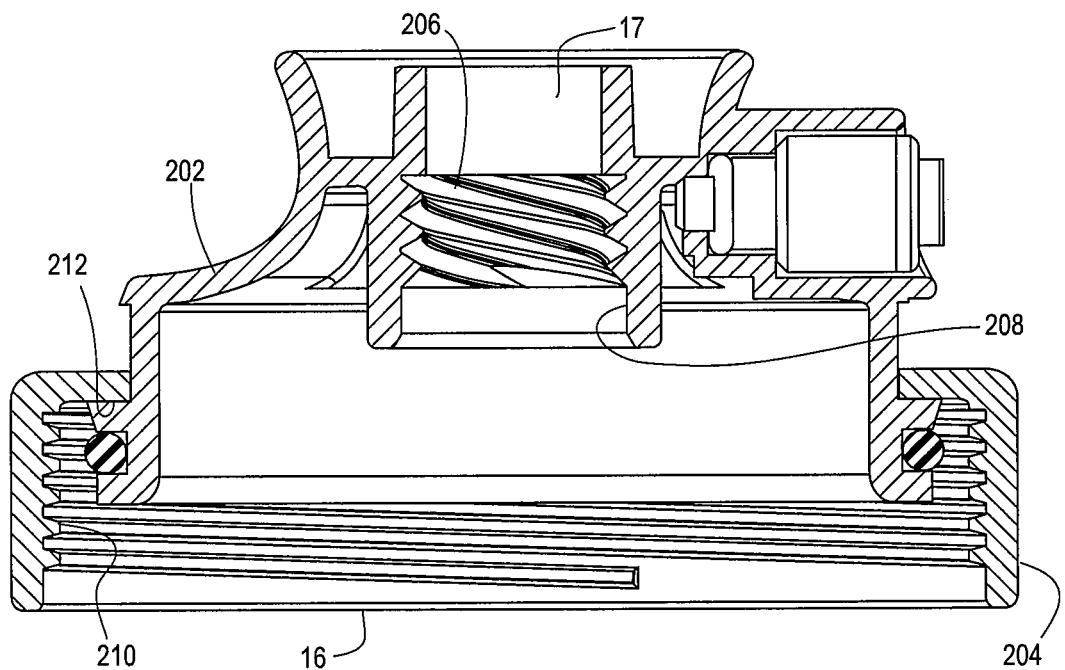
FIG. 13 is a side cut away view of a cap useful in the aerosol fluid dispensing systems of this invention.

An especially useful cap 16 is shown in FIG. 13. The cap 16 of FIG. 13 is a two piece cap including a first cap portion 202 and a second cap portion 204. The first cap portion 202 includes aperture 17 having internal threads 206 that engage with threads 426 of the valve assembly to form the pressure resistant pouch seal. The seal can be formed by the user holding the pouch and rotating first cap portion to engage the threads and index the first cap portion until O-ring 340 seals against the bottom inside surface 208 of aperture 17.

Once the pouch is attached to cap 16 and a pressure resistant pouch seal is formed, the pouch, bottom first, is dropped into opening 40 to pressurizable container 10 until threads 210 on the inside surface of the second cap portion 204 engage threads 58 on the outside surface of pressurizable chamber opening 40. Since first cap portion 202 and second cap portion 204 can rotate independently of one another, second cap portion 204 can be partially or fully threaded onto opening 40 without rotating the pouch that is attached to first cap portion 202. Second cap portion is threaded onto opening 40 until the opening 40 abuts O-ring 52 on second cap portion 204 to form a pressure resistant cap seal. When cap 16 is fully engaged with opening 40, first cap portion 202 and second cap portion 204 will include a cap seal 212.

Figure 11:
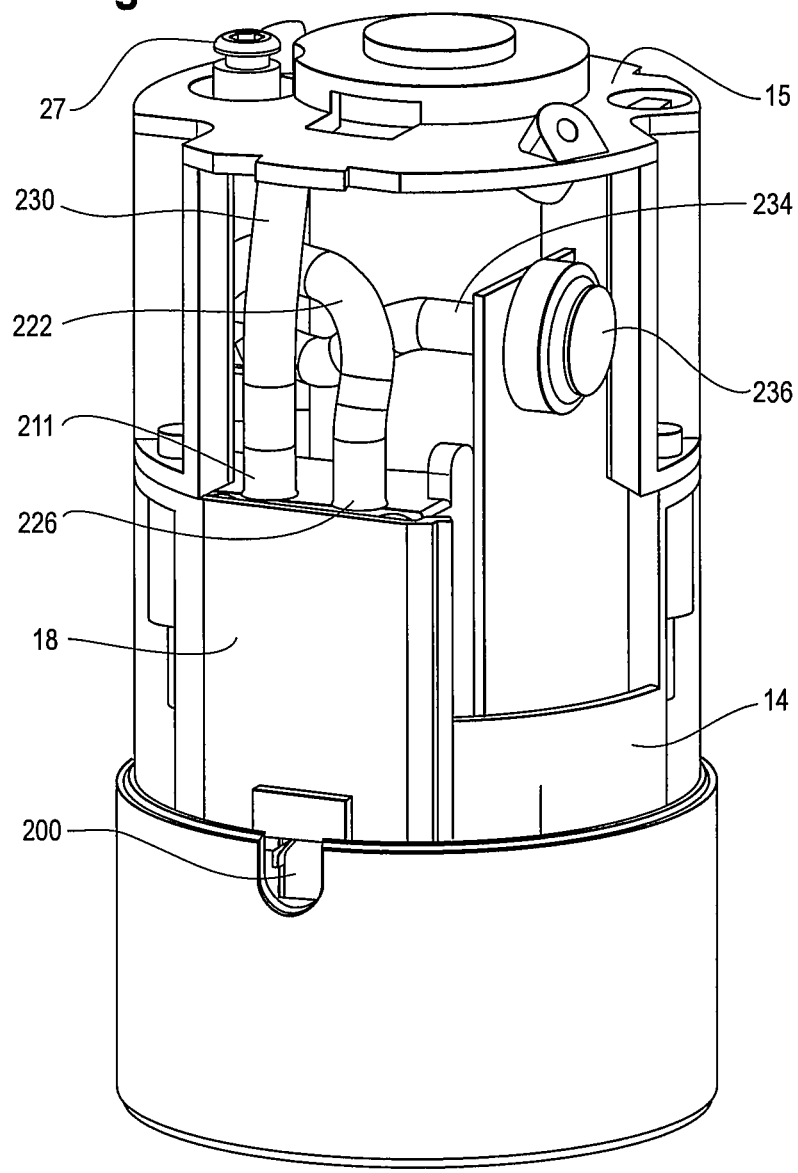
FIG. 11 is a view of a pressurization mechanism embodiment of this invention.

A pressurizing means for pressurizing the pressurizable chamber is located in second chamber 14 of container 10. The pressurizing means, shown in FIG. 11, is a battery-operated compressor along with associated conduits and control elements and includes a compressor 18. Also shown is an inlet conduit 222 having an inlet 200 on an external surface of container 10 and an outlet 226 at the compressor inlet. The compressor includes an outlet conduit 230 having an inlet 211 at the compressor outlet and an opening 40 into the pressurizable chamber. Outlet conduit further includes a second static outlet 234 that is associated with load cell 236.

In this embodiment, second chamber 14 is not be pressurized. This reduces the total volume of container 10 that must be pressurized and provides for speedier pressurization of pressurizable chamber 12. Upon activation, compressor 18 pressurizes container 10 to a set pressure at which time load cell 236 detects the set pressure is reached and causes compressor 18 to be turned off. As long as the device remains on, load cell 236 will continue to monitor system pressure. If the system pressure falls below the set pressure, then compressor 18 is activated to pressurize pressurizable chamber 12. The automatic activation and deactivation of compressor 18 continues as needed so long as the load cell 236, compressor 18 and associated control electronics remain on and powered.

Figure 12:
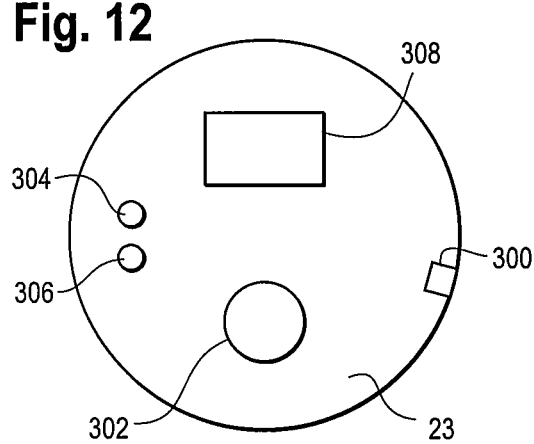
FIG. 12 is a bottom view of a reusable propellantless aerosol fluid dispensing system container embodiment of this invention.

FIG. 12 is a schematic of an embodiment of the bottom of container 10 showing optional device control features. The control features include a charge port 300 for associating a rechargeable battery located in second chamber 14 with an electricity source to recharge the battery. Also shown is a power button 302 for turning the pressurizing mechanism on or off. A ready light 304 indicates, in green for example, that the device is pressurized and ready to use. An error light 306 indicates, in red for example, that there is a problem with the device such as a problem when pressurizing the pressurizable chamber. Finally, a battery indicator 308 provides the user with visible information about the battery such as battery power level and/or an indication, for example by blinking, when the battery is being charged. Any other useful control features can be added to the container of this invention. For example, a port can be added to the container to allow a user to easily program a microprocessor associated with the control electronics to operate the container at different pressures. A bar code reader can be built into the container to allow the device to automatically set the container pressure based upon reading a barcode or some other indicator associated with a pouch being placed in the container.

The control electronics will typically be placed on a circuit board that is located in second chamber 14 along with the pressurizing device(s) and control mechanism(s). The control electronics may include, for example, a processor for controlling the compressor to maintain a set pressure in pressurizer both chamber 12, for controlling the ready light, the error light, the battery power indicator and for controlling any other desired features of the device. For example, the control electronics can turn itself off if the device has been sitting idle for a defined period of time.

The container 10 of this invention may be made of any materials that can be formed into a pressurizable container. Because container 10 is intended to be used over and over again, the material should be durable. Examples of useful container materials include metals, plastics and fiber reinforced resin materials such as glass fiber filled nylon. In one embodiment, the container can include a portion, such as the cap, this is made from transparent plastic or glass to allow the user to view the pouch inside the container. This can be useful where the pouch is also transparent and the color of paint inside the pouch can be viewed or where the pouch is colored or otherwise coded to provide a visible indication of its contents.

The pouches of this invention are intended to hold any type of fluid that is capable of being driven by pressure through a valve or nozzle that is useful in conjunction with the pouch. The fluids can be homogeneous fluids or heterogeneous fluids that require shaking are mixing before use. In addition, the fluids can contain particulate materials such as pigments, resins, texturizing components, fillers and the like. In one embodiment, the pouches of this invention contain paints, dyes, stains and/or varnishes which optionally include particulate materials.

It will be understood that the present invention has been described above purely by way of example, and modification of detail can be made within the scope of the invention.

What is claimed is:

1. A propellantless aerosol fluid dispensing system comprising:
    a container having a pressurizable chamber and a cap, a combination of the pressurizable chamber and the cap forming a pressure resistant cap seal, the cap further including at least one aperture;
    a pressurizing means for intermittently or continuously pressurizing the pressurizable chamber;
    a pressure-collapsible pouch assembly comprising a valve assembly and a pouch, the pouch containing a disposable fluid material and having at least one opening;
    the valve assembly comprising a fitment, a valve, and a nozzle wherein the fitment is located in the pouch opening such that the pouch opening is sealed to the fitment such that the valve assembly valve and nozzle extend at least partially beyond the pouch and wherein the fitment includes a diameter portion that is located inside of the pouch so as to prevent inside wall portions of the pouch in a vicinity of the fitment from moving towards one another to an extent to inhibit flow during use; and
    a pressure resistant pouch seal.

2. The system of claim 1 wherein the container includes a second chamber adjacent to the first chamber.

3. The system of claim 2 wherein the pressurizing means is at least partially located in the second chamber.

4. The system of claim 2 wherein the pressurizing means is located entirely in the second chamber.

5. The system of claim 2 wherein a wall separates the pressurizable chamber from the second chamber.

6. The system of claim 2 wherein, in operation, the second chamber is not pressurized.

7. The system of claim 1 wherein the pressurizing means is a battery operated compressor.

8. The system of claim 7 wherein the pressurizing means includes a load cell for monitoring the pressure of pressurizable chamber wherein the compressor is activated and deactivated based upon load cell pressure readings.

9. The system of claim 1 wherein the fitment of the pouch unites with the at least one aperture to form the pressure resistant pouch seal.

10. The system of claim 1 wherein the fitment includes a threaded end and the at least one aperture includes complementary threads wherein the pressure resistant pouch seal is formed when the pouch fitment is threaded into the at least one aperture.

11. The system of claim 1 wherein the pouch has a flat bottom.

12. The system of claim 1 wherein the pouch includes one or more tapered seam portions.

13. The system of claim 1 wherein the valve assembly includes at least one lateral flow channel.

14. The system of claim 1 wherein the cap is a two part cap including a first cap portion and a second cap portion.

15. The system of claim 14 wherein the first cap portion engages with the valve assembly fitment to form the pressure resistant pouch seal and the second cap portion engaged with the container sealable opening to form the pressure resistant cap seal.

16. The system of claim 15 wherein the first cap portion and second cap portion move independently.

17. The system of claim 14 wherein the first cap portion engages with the valve assembly fitment to form the pressure resistant pouch seal and the second cap portion engaged with the container sealable opening to form the pressure resistant cap seal.

18. A propellantless aerosol fluid dispensing system comprising:
    a first assembly including:
        a container having a pressurizable chamber and a second chamber, the pressurizable chamber and the second chamber separated by a fixed wall, the pressurizable chamber including a sealable opening at one end of the pressurizable chamber;
        a cap associated with the pressurizable chamber sealable opening, wherein a union of the cap with the pressurizable chamber sealable opening forms a pressure resistant cap seal and wherein the cap includes an aperture;
        a pressurizing means located in the second chamber for intermittently or continuously pressurizing the pressurizable chamber; and
    a second assembly including:
        a sealed pressure-collapsible pouch assembly including a pouch and a valve assembly located in the pressurizable chamber, the pouch containing a dispensable fluid material and an opening;
        the valve assembly including a fitment, a valve and a nozzle wherein the fitment is located in the pouch opening such that the pouch opening is sealed to the fitment, the pouch being oriented in the pressurizable chamber such that one or more of the valve and nozzle extends beyond the pouch; and
        a pressure resistant pouch seal formed by a combination of the fitment and cap and aperture.

19. The system of claim 18 wherein the pressurizing means is a battery operated compressor and includes a load cell for monitoring the pressure of the pressurizable chamber wherein the compressor is activated and deactivated based upon load cell pressure readings.

* * * * *